United States Patent [19]

Nagashima

[11] Patent Number: 4,984,121
[45] Date of Patent: Jan. 8, 1991

[54] MAGNETIC RECORDING/REPRODUCTION APPARATUS HAVING NEGATIVE AND POSITIVE PRESSURE GENERATING MEMBERS FOR DEFORMING A FLEXIBLE MAGNETIC DISK

[75] Inventor: Yasuo Nagashima, Tokyo, Japan
[73] Assignee: Fuji Photo Film Co., Ltd., Kanagawa, Japan
[21] Appl. No.: 302,296
[22] Filed: Jan. 27, 1989

[30] Foreign Application Priority Data

Feb. 8, 1988 [JP] Japan .................................. 63-25726

[51] Int. Cl.⁵ ............................................ G11B 15/60
[52] U.S. Cl. ................................................ 360/130.34
[58] Field of Search ..................................... 360/130.34

[56] References Cited

U.S. PATENT DOCUMENTS

| | | | |
|---|---|---|---|
| 4,652,959 | 3/1987 | Hamada | 360/130.34 |
| 4,734,809 | 3/1988 | Inuma et al. | 360/130.34 |
| 4,794,482 | 12/1988 | Horio et al. | 360/130.34 |
| 4,814,922 | 3/1989 | Osanai | 360/130.34 |

Primary Examiner—Robert S. Tupper
Attorney, Agent, or Firm—Sughrue, Mion, Zinn, Macpeak & Seas

[57] ABSTRACT

A magnetic recording/reproduction apparatus using a magnetic head in sliding contact with a flexible magnetic disk for recording and reproduction, which has a negative pressure generating member disposed at the upstream side of the magnetic head and at the same side of the magnetic head with respect to the flexible magnetic disk, having an inclined surface inclined to be farther from the flexible magnetic disk towards the downstream side, and a positive pressure generating member disposed at the downstream side of the magnetic head and at the opposite side of the magnetic head with respect to the flexible magnetic disk, having an inclined surface inclined to be closer to the flexible magnetic disk towards the downstream side, the rotating flexible magnetic disk being attracted by the negative pressure and urged by the possible pressure to achieve stable sliding contact with the magnetic head.

3 Claims, 2 Drawing Sheets

MAGNETIC RECORDING/REPRODUCTION APPARATUS HAVING NEGATIVE AND POSITIVE PRESSURE GENERATING MEMBERS FOR DEFORMING A FLEXIBLE MAGNETIC DISK

BACKGROUND OF THE INVENTION

This invention relates to a magnetic recording/reproduction apparatus.

To make high-density recording on a rotating flexible magnetic disk, a magnetic head must be contacted stably with the rotating flexible magnetic disk. For this purpose, heretofore, as disclosed in Japanese Utility Model Publication Laid-open No. 61-114550/1986 or Japanese Patent Publication Laid-open No. 61-211874/1986, a positive pressure is used to achieve a head touch. Specifically, as shown in FIG. 4, a regulating plate 3 is disposed at the opposite side of a magnetic head 2 with respect to a rotating flexible magnetic disk 1, and the regulating plate 3 has inclined surfaces 3a and 3b which are inclined to be closer to the flexible magnetic disk 1 towards the downstream side to generate a positive pressure, thereby urging the flexible magnetic disk 1 to the magnetic head 2.

On the other hand, Japanese Patent Publication Laid-open No. 61-9868/1986 and U.S. Pat. No. 4,620,250 describe use of a negative pressure to make a head touch. In the Japanese Patent Publication, as shown in FIG. 5, guide members 4 and 5 are disposed at the upstream and downstream side and the same side of the magnetic head 2 with respect to the flexible magnetic disk 1, the guide members 4 and 5 are provided with inclined surfaces 4a and 5a which are inclined to be farther from the flexible magnetic disk 1 towards the downstream side to generate a negative pressure, thereby attracting the flexible magnetic disk 1 to the magnetic head 2.

However, with the device as shown in FIG. 4, since the flexible magnetic disk 1 differs in rigidity between the inner peripheral portion and the outer peripheral portion, as the magnetic head is moved from the inner peripheral portion to the outer peripheral portion, positive pressure generated by the regulating plate 3 varies, and it is difficult to obtain a stable head touch. Regulating plates with various shapes have thus far been proposed, but these regulating plates have not provided a sufficient effect.

On the other hand, the device as shown in FIG. 5, in which the guide members 4 and 5 are moved together with the magnetic head 2 in a radial direction to solve the above problem, has been defective, among others, in that if the negative pressure is too large, the flexible magnetic disk 1 will come into contact with the guide members 4 and 5, and the recording surface can be scratched.

With a view to obviate the prior art problems of magnetic recording/reproduction apparatus, it is a primary object of the present invention to provide a magnetic recording/reproduction apparatus, in which a flexible magnetic disk is urged by a positive pressure and, at the same time, attracted by a negative pressure towards a magnetic head to achieve a consistently stable head touch.

SUMMARY OF THE INVENTION

In accordance with the present invention which attains the above object, there is provided a magnetic recording apparatus for recording and reproduction using a magnetic head which is in sliding contact with a rotating flexible magnetic disk, comprising a negative pressure generating member disposed at the upstream of the magnetic head and at the same side of the magnetic head with respect to the flexible magnetic disk, and a positive pressure generating member disposed at the downstream of the magnetic head and at the opposite side of the magnetic head with respect to the flexible magnetic disk, the negative pressure generating member having an inclined surface which is inclined to be farther from the flexible magnetic disk towards the downstream side, and the positive pressure generating member having an inclined surface which is inclined to be closer to the flexible magnetic disk towards the downstream side.

The rotating flexible magnetic disk is attracted towards the inclined surface of the negative pressure generating member generating a negative pressure and, at the same time, is urged from the inclined surface of the positive pressure generating member generating a positive pressure, thus obtaining a stable sliding contact with the magnetic head.

DESCRIPTION OF PREFERRED EMBODIMENT

Figure 1:
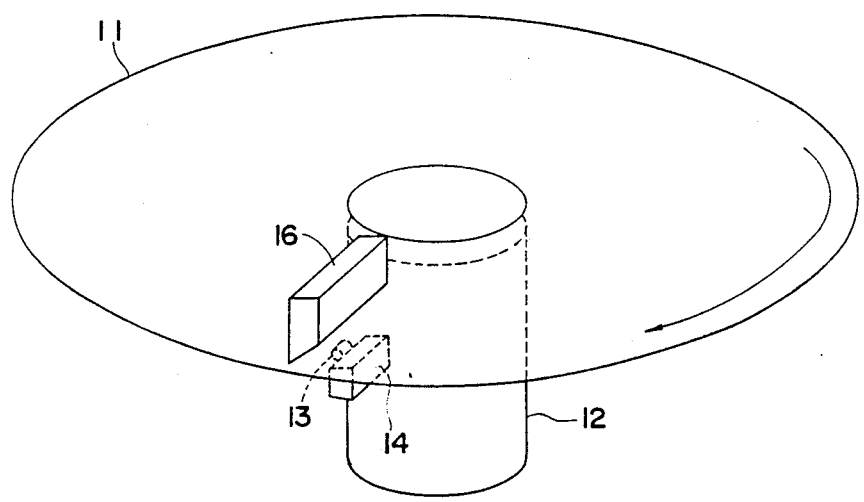
FIG. 1 and FIG. 2 are schematic oblique view and sectional view respectively showing an embodiment of the magnetic recording/reproduction apparatus according to the present invention.
Figure 2:
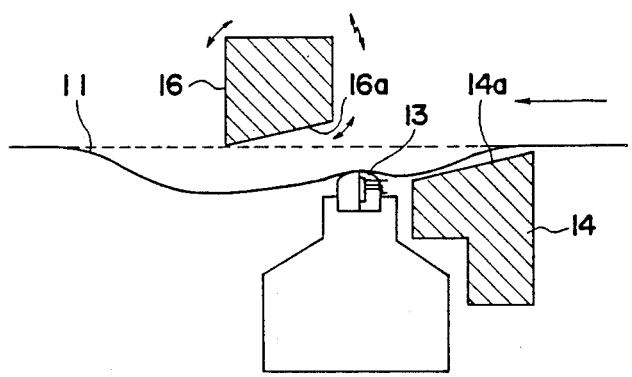
Figure 3:
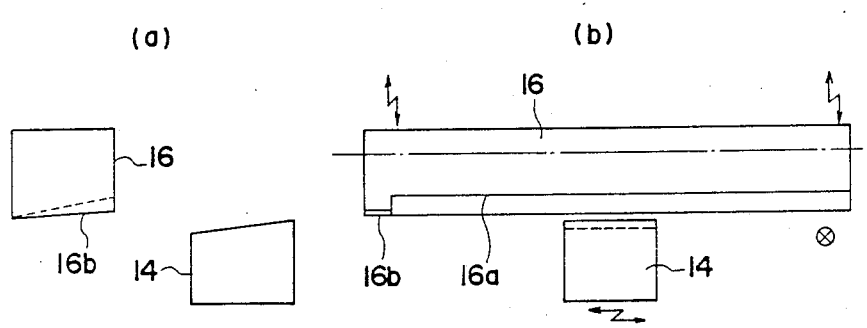
FIG. 3(a) and FIG. 3(b) are schematic front and side views showing a positive pressure generating member and a negative pressure generating member, respectively.
Figure 4:
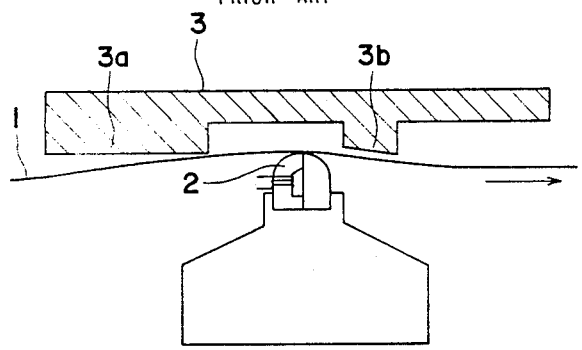
FIG. 4 and FIG. 5 are schematic sectional views showing prior art magnetic recording/reproduction apparatus.
Figure 5:
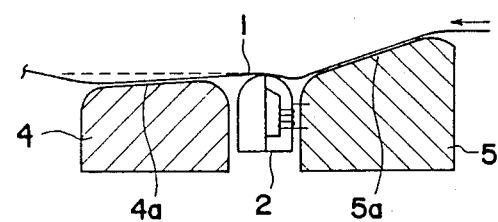

A preferred embodiment of the present invention will now be described in detail with reference to the drawings. Referring to FIGS. 1 to 3 which are schematic views of the embodiment, a flexible magnetic disk 11 is attached to a spindle motor 12 and is rotated, and a magnetic head 13 is disposed facing the lower surface which is the recording surface of flexible magnetic disk 11. By a moving mechanism (not shown), the magnetic head 13 is movable in the radial direction of the flexible magnetic disk 11. The flexible magnetic disk 11 includes a floppy disk and a video floppy disk, on which a number of concentric tracks are formed. For a video floppy disk, for example, 50 tracks are formed concentrically, with a track width of 60 $\mu$m and a guard band width 40 $\mu$m. The magnetic head 13 has a width corresponding to the track width and is moved in the radial direction of the flexible magnetic disk at intervals of the track width.

Further, a negative pressure generating member 14 is provided at the upstream side of the magnetic head 13 and at the lower side of the flexible magnetic disk 11. The negative pressure generating member 14 is positioned immediately ahead of the magnetic head 13, and is movable integrally with the magnetic head 13. The negative pressure generating member 14 has a short length in the radial direction, and on the upper surface of which is formed an inclined surface 14a which is inclined to be farther from the flexible magnetic disk 11 towards the downstream side. The inclination angle and area of the inclined surface 14a can be adequately determined so that an adequate negative pressure is generated. The negative pressure generating member 14 is preferably made from a material which will not scratch the flexible magnetic disk 11 even if it incidentally comes into contact with the flexible magnetic disk 11.

In addition, a positive pressure generating member 16 is provided at the downstream side of the magnetic head 13 and at the upper side of the flexible magnetic disk 11. The positive pressure generating member 16 is an elongate member extending over the entire length in the radial direction of the flexible magnetic disk 11, and is longer than the moving distance of the magnetic head 13. Lower surface of the positive pressure generating member 16 is an inclined surface 16a which is inclined to be closer to the flexible magnetic disk 11 towards the downstream side. The inclination angle and area of the inclined surface 16a can be adequately determined so that an adequate positive pressure is generated. Further, as shown in FIGS. 3(a) and 3(b), the positive pressure generating member 16 is independently movable vertically and swingable, enabling fine positional adjustment. The positive pressure generating member 16 is provided on its outermost periphery with a protruding portion 16b which holds the outer peripheral portion of the flexible magnetic disk 11 to narrow air flow towards the outer periphery, thereby generating a positive pressure.

In the embodiment with the above arrangement of the magnetic recording/reproduction according to the present invention, when the flexible magnetic disk 11 is rotated, since the inclined surface 14a of the negative pressure generating member 14 is slanted to be farther from the flexible magnetic disk 11 towards the downstream side, a negative pressure is generated which attracts the flexible magnetic disk 11 towards the magnetic head 13. At the same time, since the inclined surface 16a of the positive pressure generating member 16 is slanted to be closer to the flexible magnetic disk 11, a positive pressure is generated which urges the flexible magnetic disk 11 towards the magnetic head 13. Thus, the flexible magnetic disk 11 is applied with a positive pressure and a negative pressure onto its front and back surfaces to be attracted and urged towards the magnetic head 13. Therefore, whereas with only a positive pressure or a negative pressure, only an insufficient pressing force is generated and a stable head touch cannot be achieved, when both a positive pressure and a negative pressure are applied simultaneously, with the positive pressure generating member 16 properly adjusted, a stable head touch is consistently obtained over the entire moving range of the magnetic head.

Further, since the outermost periphery of the flexible magnetic disk 11 is held by a positive pressure generated by the protruding portion 16b provided on the positive pressure generating member 16, a stable head touch is maintained even if the magnetic head is moved towards the outer periphery. Moreover, since the negative pressure generating member 14 is shorter than the positive pressure generating member 16, there is less possibility of scratching the recording surface by a contact of the flexible magnetic disk 11 with the negative pressure generating member 14.

In the above-described embodiment, the inclined surface 14a of the negative pressure generating member 14 and the inclined 16a of the positive pressure generating member 16 are inclined linearly. However, alternatively, these inclined surfaces can be inclined stepwise or curved. Also, the positive pressure generating member 16 can alternatively be disposed at the upstream side of the magnetic head 13 and the negative pressure generating member 14 be disposed at the downstream side of the magnetic head.

As described above in detail with reference to the embodiment, the present invention applies a positive pressure and a negative pressure simultaneously to the flexible magnetic disk to attract and urge it, thereby enabling a consistently uniform head touch over the entire surface of the flexible magnetic disk from the inner periphery to the outer periphery, with considerably reduced possibility of scratching the recording surface.

I claim:
1. A magnetic recording/reproduction apparatus using a magnetic head in sliding contact with a flexible magnetic disk for recording and reproduction, said disk being rotatable about an axis and having a periphery, comprising: a negative pressure generating member disposed at the upstream side of said magnetic head and at the same side of said magnetic head with respect to said flexible magnetic disk, and a positive pressure generating member at the downstream side of said magnetic head and at the opposite side of said magnetic head with respect to said flexible magnetic disk, said negative pressure generating member having an inclined surface inclined to be farther from said flexible magnetic disk towards the downstream side, and said positive pressure generating member having an inclined surface to be closer to said flexible magnetic disk towards the downstream side.

2. A magnetic recording/reproduction apparatus as claimed in claim 1, wherein said magnetic head is moveable in a radial direction from said disk axis to change tracks and said negative pressure generating member is moveable integrally with said magnetic head.

3. A magnetic recording/reproduction apparatus as claimed in claim 1, wherein said positive pressure generating member comprises a protruding portion disposed at an outer portion of said disk for narrowing spiral air flow generated in association with rotation of said flexible magnetic disk and holding the outer periphery of said flexible magnetic disk.

* * * * *